United States Patent [19]

Thrower et al.

[11] 3,998,648
[45] Dec. 21, 1976

[54] MONOLITHIC REFRACTORIES

[75] Inventors: Stephen Whitney Thrower; George Hugh Criss, both of Bethel Park; Daniel Eusebius Moniot, Glenshaw, all of Pa.

[73] Assignee: Dresser Industries, Inc., Dallas, Tex.

[22] Filed: Sept. 8, 1975

[21] Appl. No.: 611,385

[52] U.S. Cl. .............................................. 106/67
[51] Int. Cl.$^2$ ........................................ C04B 35/10
[58] Field of Search .............................. 106/65, 67

[56] References Cited
UNITED STATES PATENTS 3,832,193   8/1974   Parsons et al. ..................... 106/67

*Primary Examiner*—J. Poer
*Attorney, Agent, or Firm*—Raymond T. Majesko; John N. Hazelwood

[57] ABSTRACT

The disclosure relates to monolithic refractories which can be used on the job site without any preparation, i.e. addition of additives and consists of a high alumina containing material, a reactive alumina containing material, kaolin clay and crude kyanite to which are added the combination of phosphoric acid and water.

4 Claims, No Drawings

MONOLITHIC REFRACTORIES

Refractories are non-metallic materials used to withstand high temperature. More specifically, they are the materials which are used to build high temperature steel making and glass making furnaces. Most refractories are supplied as preformed shapes, including brick, which have been formed by extruding or pressing. Not all refractories are supplied as shapes, however. Some refractories referred to as refractory monoliths, are supplied in a particulate form. These refractories are rammed, cast, gunned or trowelled into place as opposed to being built of jointed brickwork, and as a result, are monolithic. Monolithic ramming mixes comprised of particulate refractory material are usually tempered with about 3% water and have properties which permit ramming or tamping into place. Monolithic casting mixes are similar to ramming mixes, but are usually tempered with more water and have properties which permit them to be cast, usually with the aid of vibration.

Casting and ramming mixes typically contain a refractory cement or binder. The binder must provide linings prepared from ramming and casting mixes with sufficient rigidity to withstand the conditions encountered in the particular furnace. Often the binder is merely temporary and its bond is replaced at elevated temperatures by a ceramic bond formed by sintering and coalescing of the particles comprising the monolithic lining. On the other hand, the binder may become part of the ceramic bond formed at high temperatures. Monolithic gunning mixes are particulate refractory mixes which are pneumatically impacted upon the situs to be lined or repaired. They are tempered with water either prior to being placed in the pneumatic gun or tempered at the nozzle of the gun. Gunning mixes usually contain a quick setting binder which holds the gunned lining or repair patch where it is emplaced. This invention relates to refractory monoliths, referred to above, which are finely ground preparations capable of becoming plastic and trowellable when tempered with water and suitable for patching brick work and for laying and bonding refractory brick or shapes.

Binders used in refractory monoliths and mortars are numerous and include sulphite lye, sodium silicate, molasses, dextrine, starch, gelatin, calcium aluminate cements, epsom salts, and any number of phosphates. With the exception of the phosphate binders, most refractory binders lose their strength on heating well below the temperature at which ceramic bonds are formed. Phosphate binders on the other hand, develop bonds on heating which remain relatively strong at elevated temperatures and, to some extent, participate in the formation of ceramic bonds. Phosphate binders have the additional advantage of providing refractory linings with a certain resistance to wetting, by corrosive slags and metals. The phosphates suitable as binders for refractory monoliths comprise the soluble phosphates, including the sodium phosphate salts, sodium phosphate glasses, ammonium phosphates, and phosphoric acid. Phosphoric acid is well known to be preferable to the other phosphates because of its ability to form a much stronger bond. Typically, where phosphoric acid is used as a binder for refractory monoliths, shelf life has been poor.

Accordingly, it is an object of this invention to provide a refractory monolithic composition batch which has a phosphoric acid binder with water, and which can be shipped in a particulate form premixed with the phosphoric acid and water but which does not have poor shelf life, that is, which does not set up prior to use on the job site or exhibit settling or water separation.

In accordance with the present invention, there is provided a monolithic refractory batch composition which comprises on a weight basis, about 45 to 55% of calcined bauxite, and about 30 to 35% of calcined alumina. The batch also comprises about 0.5 to 5% of bentonite and about 0.5 to 10% of kaolin clay and about 0.5% to 10% of crude kyanite. The batch, based on its total weight, contains $P_2O_5$ in an amount equivalent to that provided by about 5 to 17% phosphoric acid of 85% concentration and a tempering fluid, such as water, in an amount between about 2 and 19%.

In a preferred embodiment, the composition comprises about 48 to 52% calcined bauxite, about 32 to 34% calcined alumina, about 1 to 3% bentonite, about 1 to 8% kaolin clay, about 1 to 8% crude kyanite, about 7 to 14% phosphoric acid and about 5 to 15% tempering fluid.

Phosphoric acid of 85% concentration is preferred in the present invention. This phosphoric acid analyzes about 62% $P_2O_5$. However, other concentrations of phosphoric acids may be employed. Phosphoric acid of 75% concentration contains about 55% of $P_2O_5$; 100% concentration contains about 76% of $P_2O_5$ and 115% concentration contains about 83% $P_2O_5$.

Further features and other objects and advantages of this invention will become apparent to those skilled in the art by a study of the following examples. In the specification and claims, all percentages are by weight. All sizings are according to the Tyler Sieve series.

Various monolithic refractory batches were prepared by first size grading the components so that a maximum of 5% is held on 4 mesh; from 3 to 20% is −4+10 mesh; from 3 to 20% is −10+28 mesh; and from 10 to 25% is −28+65 mesh. From about 50 to 65%, passes a 65 mesh screen and from about 40 to 55% passes a 150 mesh screen. After mixing the batch ingredients together, the phosphoric acid is blended into the batch followed by the addition of tempering water. The mixes and their properties are set forth in Table I below.

TABLE I

| MIX | A | B | C | D |
|---|---|---|---|---|
| Calcined South American Bauxite | 52% | 50% | 52% | 57% |
| Calcined Alumina | 34 | 35 | 34 | 37 |
| Crude Kyanite | 8 | 9 | 9 | — |
| Ball Clay | — | — | — | 6 |
| Kaolin Clay | 5 | 5 | 5 | — |
| Bentonite | 1 | 1 | — | — |
| 85% Phosphoric Acid | +7 | +8 | +7.5 | +16 |
| Water | +12 | +14 | +8.1 | +5.8 |
| PROPERTIES AFTER DRYING AT 500° F | | | | |
| Density, pcf | | 152 | 137 | Not tested Poor shelf life |

TABLE I-continued

| MIX | A | B | C | D |
|---|---|---|---|---|
| Modulus of Rupture, psi | 1,790 | 840 | | |
| Cold Crushing Strength, psi | 2,330 | — | | |
| Porosity, % | 27.5 | 34.9 | | |

Mixes A and B are according to the present invention. These mixes have the desired properties set forth above including relatively good shelf or storage life. Mixes C and D are not according to the present invention. It is considered that the presence of bentonite and kaolin clay is critical to the success of the invention mixes.

The monolithic refractories of the present invention are primarily used as a patching mix; however, they may be trowelled or vibration cast into place. The maximum service temperature for the refractories is about 3100° F. These refractories adhere very well to the existing refractories and resist cracking or peeling specially when used to patch high alumina refractories. The monolithic materials are shipped ready to use and require no mixing on the job site.

Typical chemical analyses of raw materials utilized in the examples, are set forth in Table II below.

TABLE II

| Chemical Analysis | Calcined South American Bauxite | Calcined Alumina | Crude Kyanite | Ball Clay | Bentonite | Kaolin Clay |
|---|---|---|---|---|---|---|
| $SiO_2$ | 6.4% | 0.02% | 39.9% | 61.8% | 66.1% | 45.68% |
| $Al_2O_3$ | 88.7 | 99.2 | 57.3 | 33.6 | 22.6 | 38.51 |
| $TiO_2$ | 3.3 | Trace | 1.5 | 2.2 | 0.2 | 1.43 |
| $Fe_2O_3$ | 1.5 | 0.05 | 1.0 | 1.1 | 3.8 | 0.44 |
| CaO | Trace | Trace | 0.1 | 0.2 | 1.3 | 0.24 |
| MgO | Trace | Trace | 0.1 | 0.3 | 2.9 | 0.14 |
| Alks. | 0.02 | 0.5 | 0.02 | 0.6 | 3.0 | 0.18 |
| Loss on Ignition | | 0.2 | 0.2 | | | 13.51 |

Having thus described the invention in detail and with sufficient particularity as to enable those skilled in the art to practice it, what is desired to have protected by Letters Patent is set forth in the following claims.

We claim:

1. A monolithic refractory batch composition comprising, by weight, about 45 to 55% of calcined bauxite, about 30 to 35% of calcined alumina, about 0.5 to 5% of bentonite, about 0.5 to 10% of kaolin clay, about 0.5 to 10% crude kyanite, said batch containing, based on its total weight, $P_2O_5$ in an amount equivalent to that provided by about 5 to 17% phosphoric acid of 85% concentration and a tempering fluid in an amount between about 2 and 19%.

2. The composition of claim 1 which comprises, by weight, about 48 to 52% of calcined bauxite, about 32 to 34% calcined alumina, about 1 to 3% bentonite, about 1 to 8% kaolin clay, about 1 to 8% crude kyanite, about 7 to 14% phosphoric acid and about 5 to 15% tempering fluid.

3. The composition of claim 1 which comprises, by weight, about 50 to 52% calcined bauxite, about 34 to 35% calcined alumina, about 1% bentonite, about 8 to 9% crude kyanite, about 5% kaolin clay, about 7 to 8% phosphoric acid and about 12 to 14% tempering fluid.

4. The composition of claim 1, in which the tempering fluid is water.

* * * * *